(12) United States Patent
Keith, Jr.

(10) Patent No.: US 7,908,339 B2
(45) Date of Patent: Mar. 15, 2011

(54) TRANSACTION BASED VIRTUAL FILE SYSTEM OPTIMIZED FOR HIGH-LATENCY NETWORK CONNECTIONS

(75) Inventor: Robert O. Keith, Jr., Modesto, CA (US)

(73) Assignee: Maxsp Corporation, Sunnyvale, CA (US)

( * ) Notice: Subject to any disclaimer, the term of this patent is extended or adjusted under 35 U.S.C. 154(b) by 1237 days.

(21) Appl. No.: 11/144,179

(22) Filed: Jun. 2, 2005

(65) Prior Publication Data

US 2006/0047716 A1 Mar. 2, 2006

Related U.S. Application Data

(60) Provisional application No. 60/577,148, filed on Jun. 3, 2004.

(51) Int. Cl.
G06F 15/16 (2006.01)
(52) U.S. Cl. ............. 709/217; 711/1; 707/827; 707/831
(58) Field of Classification Search .................. 709/217
See application file for complete search history.

(56) References Cited

U.S. PATENT DOCUMENTS

| 4,866,635 | A | 9/1989 | Kahn et al. ..................... 364/513 |
| 5,602,990 | A | 2/1997 | Leete ........................ 395/183.22 |
| 5,649,196 | A | 7/1997 | Woodhill et al. ............. 395/620 |
| 5,659,743 | A | 8/1997 | Adams et al. ................. 395/621 |
| 5,802,364 | A | 9/1998 | Senator et al. |
| 5,812,751 | A | 9/1998 | Ekrot et al. |
| 5,835,911 | A | 11/1998 | Nakagawa et al. |
| 5,933,647 | A | 8/1999 | Aronberg et al. |
| 5,950,010 | A | 9/1999 | Hesse et al. |
| 5,974,547 | A | 10/1999 | Klimenko ......................... 713/2 |
| 6,012,152 | A | 1/2000 | Douik et al. ..................... 714/26 |
| 6,029,196 | A | 2/2000 | Lenz .............................. 709/221 |
| 6,067,582 | A | 5/2000 | Smith et al. |
| 6,144,959 | A | 11/2000 | Anderson et al. |
| 6,170,065 | B1 | 1/2001 | Kobata et al. ..................... 714/7 |
| 6,189,101 | B1 | 2/2001 | Dusenbury, Jr. |
| 6,209,089 | B1 | 3/2001 | Selitrennikoff et al. .......... 713/2 |
| 6,212,660 | B1 | 4/2001 | Joeressen et al. ............. 714/758 |
| 6,282,711 | B1 | 8/2001 | Halpern et al. |
| 6,292,827 | B1 | 9/2001 | Raz ............................. 709/217 |
| 6,301,612 | B1 | 10/2001 | Selitrennikoff et al. ...... 709/220 |
| 6,311,221 | B1 | 10/2001 | Raz et al. ...................... 709/231 |
| 6,317,761 | B1 | 11/2001 | Landsman et al. ............ 707/513 |
| 6,349,137 | B1 | 2/2002 | Hunt et al. |
| 6,356,915 | B1 | 3/2002 | Chtchetkine et al. ......... 707/200 |
| 6,363,400 | B1 | 3/2002 | Chtchetkine et al. ......... 707/200 |

(Continued)

OTHER PUBLICATIONS

Shepler. RFC 3530 Network File System. Apr. 2003.*

(Continued)

*Primary Examiner* — Hassan Phillips
*Assistant Examiner* — Bryan Lee
(74) *Attorney, Agent, or Firm* — Haverstock & Owens LLP

(57) ABSTRACT

A method and system are provided for a virtual distributed data manager. In one example of the method, the virtual data manager involves receiving a request to mount a file system onto the client computer, wherein the file system is stored on the server system and contains the one or more data files; transferring a copy of a directory structure of the file system stored on the server system to the client computer; and creating on the client computer a virtual file system including the copy of the directory structure. The method is preferably transaction based and provides high performance on high latency network connections.

13 Claims, 8 Drawing Sheets

U.S. PATENT DOCUMENTS

| | | |
|---|---|---|
| 6,366,296 B1 | 4/2002 | Boreczky et al. ............. 345/719 |
| 6,378,035 B1 | 4/2002 | Parry et al. .................... 711/110 |
| 6,421,777 B1 | 7/2002 | Pierre-Louis et al. ............ 713/2 |
| 6,449,658 B1 | 9/2002 | Lafe et al. ..................... 709/247 |
| 6,463,530 B1 | 10/2002 | Sposato ............................ 713/2 |
| 6,473,794 B1 | 10/2002 | Guheen et al. ................ 709/223 |
| 6,477,531 B1 | 11/2002 | Sullivan et al. .................. 707/10 |
| 6,490,677 B1 | 12/2002 | Aguilar et al. ..................... 713/1 |
| 6,536,037 B1 | 3/2003 | Guheen et al. ................ 717/151 |
| 6,556,950 B1 | 4/2003 | Schwenke et al. ............ 702/183 |
| 6,574,618 B2 | 6/2003 | Eylon et al. ........................ 707/1 |
| 6,606,744 B1 | 8/2003 | Mikurak ....................... 717/174 |
| 6,625,651 B1 | 9/2003 | Swartz et al. |
| 6,625,754 B1 | 9/2003 | Aguilar et al. |
| 6,636,857 B2 | 10/2003 | Thomas et al. ................. 707/10 |
| 6,654,797 B1 | 11/2003 | Kamper ........................ 709/220 |
| 6,654,801 B2 | 11/2003 | Mann et al. |
| 6,694,375 B1 | 2/2004 | Beddus et al. ................ 709/249 |
| 6,697,852 B1 | 2/2004 | Ryu |
| 6,704,886 B1 | 3/2004 | Gill et al. |
| 6,718,464 B2 | 4/2004 | Cromer et al. ..................... 713/2 |
| 6,728,530 B1 | 4/2004 | Heinonen et al. |
| 6,735,625 B1 | 5/2004 | Ponna ........................... 709/223 |
| 6,751,658 B1 | 6/2004 | Haun et al. .................... 709/222 |
| 6,757,729 B1 | 6/2004 | Devarakonda et al. |
| 6,757,894 B2 | 6/2004 | Eylon et al. ................... 717/177 |
| 6,816,462 B1 | 11/2004 | Booth, III et al. ............ 370/248 |
| 6,816,882 B1 | 11/2004 | Conner et al. |
| 6,871,210 B1 | 3/2005 | Subramanian ................ 709/203 |
| 6,885,481 B1 | 4/2005 | Dawe |
| 6,886,020 B1 | 4/2005 | Zahavi et al. ................. 707/204 |
| 6,915,343 B1 | 7/2005 | Brewer et al. ................. 709/224 |
| 6,954,853 B2 | 10/2005 | Wang et al. |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Lagosanto et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,178,166 B1 | 2/2007 | Taylor et al. |
| 7,194,445 B2 | 3/2007 | Chan et al. |
| 7,200,779 B1 | 4/2007 | Coss, Jr. et al. |
| 7,210,143 B2 | 4/2007 | Or et al. |
| 7,237,122 B2 | 6/2007 | Kadam et al. |
| 7,287,053 B2 | 10/2007 | Bodin |
| 7,328,367 B2 | 2/2008 | Ukai et al. |
| 7,392,046 B2 | 6/2008 | Leib et al. |
| 7,401,125 B1 | 7/2008 | Uchida et al. |
| 7,480,822 B1 | 1/2009 | Arbon et al. |
| 7,512,584 B2 | 3/2009 | Keith, Jr. |
| 7,627,694 B2 | 12/2009 | Sreenivasan et al. |
| 7,698,487 B2 | 4/2010 | Rothman et al. |
| 7,788,524 B2 | 8/2010 | Wing et al. |
| 2001/0034736 A1 | 10/2001 | Eylon et al. ................... 707/200 |
| 2001/0037323 A1 | 11/2001 | Moulton et al. .................. 707/1 |
| 2001/0037399 A1 | 11/2001 | Eylon et al. ................... 709/231 |
| 2001/0037400 A1 | 11/2001 | Raz et al. ...................... 709/232 |
| 2001/0044850 A1 | 11/2001 | Raz et al. ...................... 709/231 |
| 2001/0049793 A1 | 12/2001 | Sugimoto ..................... 713/200 |
| 2002/0007418 A1 | 1/2002 | Hegde et al. .................. 709/231 |
| 2002/0013827 A1 | 1/2002 | Edstrom et al. |
| 2002/0042833 A1 | 4/2002 | Hendler et al. ............... 709/231 |
| 2002/0049764 A1 | 4/2002 | Boothby et al. .............. 707/100 |
| 2002/0083183 A1 | 6/2002 | Pujare et al. .................. 709/231 |
| 2002/0087717 A1 | 7/2002 | Artzi et al. .................... 709/236 |
| 2002/0087883 A1 | 7/2002 | Wohlgemuth et al. ........ 713/201 |
| 2002/0087963 A1 | 7/2002 | Eylon et al. ................... 717/174 |
| 2002/0091763 A1 | 7/2002 | Shah et al. .................... 709/203 |
| 2002/0094868 A1 | 7/2002 | Tuck et al. |
| 2002/0107920 A1 | 8/2002 | Hotti |
| 2002/0116585 A1 | 8/2002 | Scherr .......................... 711/133 |
| 2002/0124092 A1 | 9/2002 | Urien ............................ 709/229 |
| 2002/0129089 A1 | 9/2002 | Hegde et al. .................. 709/200 |
| 2002/0138640 A1 | 9/2002 | Raz et al. ...................... 709/231 |
| 2002/0157089 A1 | 10/2002 | Patel et al. .................... 717/178 |
| 2002/0161868 A1 | 10/2002 | Paul et al. ..................... 709/221 |
| 2002/0161908 A1 | 10/2002 | Benitez et al. ................ 709/231 |
| 2002/0169797 A1 | 11/2002 | Hegde et al. ............... 707/500.1 |
| 2002/0188941 A1 | 12/2002 | Cicciarelli et al. |
| 2003/0004882 A1 | 1/2003 | Holler et al. ..................... 705/51 |
| 2003/0005096 A1 | 1/2003 | Paul et al. ..................... 709/222 |
| 2003/0009538 A1 | 1/2003 | Shah et al. .................... 709/219 |
| 2003/0033379 A1 | 2/2003 | Civanlar et al. ............... 709/218 |
| 2003/0036882 A1 | 2/2003 | Harper et al. |
| 2003/0037328 A1 | 2/2003 | Cicciarelli et al. |
| 2003/0041136 A1 | 2/2003 | Cheline et al. ................ 709/223 |
| 2003/0046371 A1 | 3/2003 | Falkner |
| 2003/0051128 A1 | 3/2003 | Rodriguez et al. ............ 713/100 |
| 2003/0055878 A1 | 3/2003 | Fletcher et al. |
| 2003/0078960 A1 | 4/2003 | Murren et al. |
| 2003/0110188 A1 | 6/2003 | Howard et al. |
| 2003/0126242 A1 | 7/2003 | Chang .......................... 709/222 |
| 2003/0140160 A1 | 7/2003 | Raz et al. ...................... 709/231 |
| 2003/0191730 A1 | 10/2003 | Adkins et al. |
| 2003/0204562 A1 | 10/2003 | Hwang |
| 2003/0233383 A1 | 12/2003 | Koskimies |
| 2003/0233493 A1 | 12/2003 | Boldon et al. |
| 2004/0010716 A1 | 1/2004 | Childress et al. |
| 2004/0068554 A1 | 4/2004 | Bales et al. |
| 2004/0093492 A1 | 5/2004 | Daude et al. .................. 713/156 |
| 2004/0104927 A1 | 6/2004 | Husain et al. |
| 2004/0123153 A1 | 6/2004 | Wright et al. ................. 713/201 |
| 2004/0128346 A1 | 7/2004 | Melamed et al. ............. 709/203 |
| 2004/0148306 A1 | 7/2004 | Moulton et al. .............. 707/101 |
| 2004/0193876 A1 | 9/2004 | Donley et al. |
| 2004/0201604 A1 | 10/2004 | Kraenzel et al. .............. 345/700 |
| 2004/0236843 A1 | 11/2004 | Wing et al. .................... 709/219 |
| 2004/0243928 A1 | 12/2004 | Hesmer et al. |
| 2005/0027846 A1 | 2/2005 | Wolfe et al. |
| 2005/0033808 A1 | 2/2005 | Cheng et al. |
| 2005/0044197 A1 | 2/2005 | Lai |
| 2005/0044544 A1 | 2/2005 | Slivka et al. |
| 2005/0108593 A1 | 5/2005 | Purushothaman et al. |
| 2005/0144218 A1 | 6/2005 | Heintz .......................... 709/202 |
| 2005/0149729 A1 | 7/2005 | Zimmer et al. ............... 713/168 |
| 2005/0160289 A1 | 7/2005 | Shay |
| 2005/0193245 A1 | 9/2005 | Hayden et al. |
| 2005/0198196 A1 | 9/2005 | Bohn et al. |
| 2005/0216524 A1 | 9/2005 | Gomes et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. ...................... 709/200 |
| 2005/0283606 A1 | 12/2005 | Williams ...................... 713/166 |
| 2006/0021040 A1 | 1/2006 | Boulanger et al. .............. 726/23 |
| 2006/0031377 A1 | 2/2006 | Ng et al. |
| 2006/0031407 A1 | 2/2006 | Dispensa et al. |
| 2006/0031529 A1 | 2/2006 | Keith, Jr. ...................... 709/227 |
| 2006/0041641 A1 | 2/2006 | Breiter et al. |
| 2006/0041759 A1 | 2/2006 | Kaliski, Jr. et al. |
| 2006/0047946 A1 | 3/2006 | Keith, Jr. ........................... 713/2 |
| 2006/0074943 A1 | 4/2006 | Nakano et al. |
| 2006/0095705 A1 | 5/2006 | Wichelman et al. .......... 711/171 |
| 2006/0143709 A1 | 6/2006 | Brooks et al. ................... 726/23 |
| 2006/0179061 A1 | 8/2006 | D'Souza et al. |
| 2006/0224544 A1 | 10/2006 | Keith, Jr. ........................ 706/60 |
| 2006/0224545 A1 | 10/2006 | Keith, Jr. ........................ 706/60 |
| 2006/0233310 A1 | 10/2006 | Adams, Jr. et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0233633 A1 | 10/2007 | Keith, Jr. ........................ 706/60 |
| 2007/0239905 A1 | 10/2007 | Banerjee et al. ................ 710/22 |
| 2007/0271290 A1 | 11/2007 | Keith, Jr. ...................... 707/101 |
| 2007/0271428 A1 | 11/2007 | Atluri |
| 2007/0274315 A1 | 11/2007 | Keith ............................ 370/392 |
| 2007/0276836 A1 | 11/2007 | Chatterjee et al. |
| 2008/0034019 A1 | 2/2008 | Cisler et al. |
| 2008/0034071 A1 | 2/2008 | Wilkinson et al. |
| 2008/0077622 A1 | 3/2008 | Keith ............................ 707/200 |
| 2008/0077630 A1 | 3/2008 | Keith ............................ 707/204 |
| 2008/0127294 A1 | 5/2008 | Keith ............................... 726/1 |
| 2008/0209142 A1 | 8/2008 | Obernuefemann |
| 2008/0294860 A1* | 11/2008 | Stakutis et al. ............... 711/162 |

| | | |
|---|---|---|
| 2008/0313632 A1 | 12/2008 | Kumar et al. |
| 2009/0094362 A1 | 4/2009 | Huff |
| 2010/0050011 A1 | 2/2010 | Takamoto et al. |

OTHER PUBLICATIONS

IBM. AFS: User Guide. 2000.*
J. P. MacDonald, "File System Support for Delta Compression," Master's Thesis, University of California at Berkeley, May 19, 2000.*
Trigdell. Efficient Algorithms for Sorting and Synchronization. 1999.*
Muthitacharoen et al. A Low-bandwidth Network File System. 2001.*
http://www.backup.com.
http://www.swapdrive.com/sdbackup.asp.
IEEE100 The Authoritative Dictionary Of IEEE Standards Terms, Seventh Edition, Jan. 2003, 3 pages.
VMware, VMWare Infrastructure Architecture Overview, Jun. 14, 2006, http:/www.vmware.com/resourse/techresources/, pp. 1-14.
VMware, Using VMware Infrastructure for Backup and Restore, Oct. 26, 2006, http:/www.vmware.com/resourse/techresources/, pp. 1-20.
Bandwidth Capping at Source http://www.24onlinebilling.com/download/whitepapers/Bandwidth%20Capping%20At%20Source.pdf pp. 1-9.
http://www.macrovision.com/products/flexnet_installshield/installshield/overview/index.shtml, pp. 1-3.
http://macrovision.com/products/flexnet_installshield/installshield/index.shtml, pp. 1-2.
http:/ www.stealthbits.com/, pp. 1-2.
http://www.microsoft.com/technet/prodtechnol/windows2000serv/maintain/featusability/inmnwp.mspx, pp. 1-36.
http://en.wikipedia.org/wik/Expert_system, pp. 1-9.
http://www.pctools.com/registry-mechanic/, pp. 1-2.
Microsoft@ Computer Dictionary, Fifth Edition, 2002, 3 pages.
Random House Unabridged Dictionary, "device: meaning and definitions," 1997, Random House Inc., retrieved via "http://dictionary.infoplease.com/device".
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785.

* cited by examiner

TRANSACTION BASED VIRTUAL FILE SYSTEM OPTIMIZED FOR HIGH-LATENCY NETWORK CONNECTIONS

RELATED APPLICATIONS

This Patent Application claims priority under 35 U.S.C. 119(e) of the U.S. Provisional Pat. App. No. 60/577,148, filed Jun. 3, 2004, entitled "Virtual Management System", which is hereby incorporated by reference. The Patent Application is related to U.S. patent application Ser. No. 10/912,652, entitled "Virtual Distributed File System", filed Aug. 4, 2004, which is herein incorporated by reference in its entirety; and concurrently filed U.S. patent application Ser. No. 11/144,263, entitled "Virtual Application Manager", which is herein incorporated by reference in its entirety.

FIELD OF THE INVENTION

The present invention relates to data files. More particularly, the present invention relates to managing data files over a network.

BACKGROUND OF THE INVENTION

In the past, the process of installing and updating applications as well as sharing information on a plurality of computers was arduous and time-consuming. Professionals would install software on each computer using compact discs (CDs), network shares or other similar methods. As mentioned, this is time-consuming as well as difficult to synchronize throughout an entire company. With the advent of computer networking, where a plurality of computers communicate together, the process became much more streamlined. Specifically, two techniques for delivering applications have been developed over the years, remote execution and local delivery.

In a remote execution embodiment, a user accesses software which is loaded and executed on a remote server under the control of the user. One example is the use of Internet-accessible CGI programs which are executed by Internet servers based on data entered by a client. A more complex system is the Win-to-Net system provided by Menta Software. This system delivers client software to the user which is used to create a Microsoft® Windows® style application window on the client machine. The client software interacts with an application program executing on the server and displays a window, which corresponds to one which would be shown if the application were installed locally. The client software is further configured to direct certain I/O operations, such as printing a file, to the client's system, to replicate the "feel" of a locally running application. Other remote-access systems, such as provided by Citrix Systems, are accessed through a conventional Internet Browser or a proprietary client and present the user with a "remote desktop" generated by a host computer which is used to execute the software.

Since the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

Once such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

In the more recent past, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application can be executed in sequences which vary according to user input and other factors.

To address the deficiencies in prior data streaming and local software delivery systems, an improved technique of delivering applications to a client for local execution has been developed. This technique called "Streaming Modules" is described in U.S. Pat. No. 6,311,221 to Raz et al. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible. To reduce streaming time, the size of code files, such as library modules, can be reduced by substituting various coded procedures with shortened streaming "stub" procedures which act as link-time substitutes for the removed code. Suitable modules to replace are those which are not required for the initial execution of the application. As the application is running locally on the client, additional modules are streamed to the client and the stub code can be dynamically replaced as the substituted procedures are received. The stub procedure can point to a streaming engine which will request a missing procedure if the program calls it before it has been received at the client. Although effective, the stub-code substitution technique used in the "Streaming Modules" system may require a reasonable degree of processing to prepare a given application for streaming. In addition, the client software required to manage the streamed modules does not necessarily integrate cleanly with the normal routines used by the operating system executing on the client machine.

To remedy some of the remaining issues, U.S. Pat. No. 6,574,618 to Eylon et al. disclosed a method and system for executing network streamed applications. Within the system, a client computer executes an application while parts of the application code are still being retrieved from the server over a network. The additional components of the application not required for startup are continuously loaded in the background until the entire application resides on the client computer. There are a number of drawbacks with this system though. The client cannot function without the server being available. Although, the application is physically available on the client once downloaded, due to encryption or other proprietary methods of preventing unauthorized access, the application is unavailable. Further, the prior art does not permit a user to access the server and applications from multiple client locations.

SUMMARY OF THE INVENTION

What is needed is an improved system having features for addressing the problems mentioned above and new features not yet discussed. Broadly speaking, the present invention fills these needs by providing a virtual distributed data manager. It should be appreciated that the present invention can be implemented in numerous ways, including as a method, a process, an apparatus, a system or a device. Inventive embodiments of the present invention are summarized below.

In one embodiment, a method of managing one or more data files over a network is provided, wherein the network is configured to be connected to a server system and to a client computer. The method comprises receiving a request to mount a file system onto the client computer, wherein the file system is stored on the server system and contains the one or more data files; transferring a copy of a directory structure of the file system stored on the server system to the client computer; and creating on the client computer a virtual file system including the copy of the directory structure.

In another embodiment, a method of managing one or more data files over a network is provided, wherein the network is configured to be connected to a server system and a client computer. The method comprises receiving a request to update a data file of the one or more data files; comparing a client prior version of the data file to a client current version of the data file; creating difference information based on the comparing of the client prior version to the client current version; and checking whether the difference information is larger than the client current version.

In still another embodiment, a server system for managing one or more data files over a network is provided, wherein the network is configured to be connected to the server system and to a client computer. The server system comprises a file system including a directory having a directory structure and the one or more data files, wherein the server system is configured to receive a request to mount the file system onto the client computer, to transfer a copy of the directory structure to client computer, and to instruct the client computer to create a virtual file system including a copy of the directory.

In yet another embodiment, a client computer for managing one or more data files over a network is provided, wherein the network is configured to be connected to the client computer and to the server system, wherein the server system includes a file system having a directory structure, wherein the client computer is configured to receive a request to mount the file system onto the client computer, wherein the client computer is further configured to receive a copy of the directory structure of the file system. The client computer comprises a virtual file system including the copy of the directory of the file system.

The invention encompasses other embodiments are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT(S)

An invention for a virtual distributed data manager (VDDM) is disclosed. Numerous specific details are set forth in order to provide a thorough understanding of the present invention. It will be understood, however, to one skilled in the art, that the present invention may be practiced with other specific details.

Overview of a Virtual Distributed Data Manager

A virtual distributed data manager (VDDM) is a set of technologies for managing a centralized network file system, distributed to clients over wide area networks (WAN's) and Internet architectures. The VDDM described here provides an end-user client a file system facility for storage and support of application data, optimized for lower performing and less reliable WAN and Internet network infrastructures. The VDDM provides central storage benefits, including security, reliability, mobility, fault tolerance and automated backups, while having the performance and access of a local file system.

Figure 1:
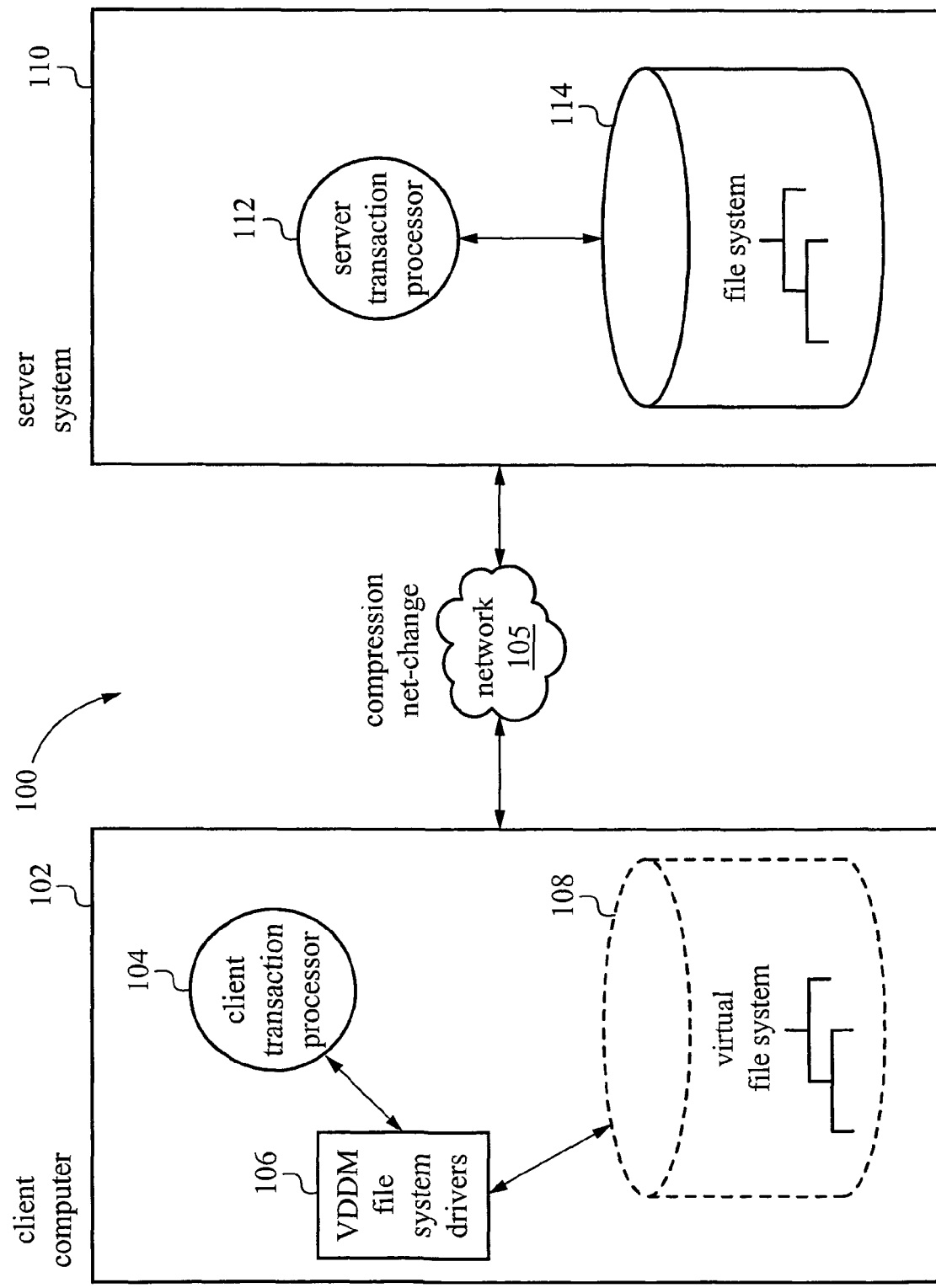
FIG. 1 is a graphical representation of a Virtual Distributed Data Manager (VDDM), in accordance with the present invention.

FIG. 1 is a graphical representation of a VDDM 100, in accordance with the present invention. The VDDM 100 provides high performance, high availability access to user data maintained on a remote server system 110. The technology makes extensive use of compression, stateless transactional based protocols, and other data transfer performance enhancement mechanisms to optimize performance.

The VDDM 100 maintains an individual user file system, or virtual file system 108, on the client computer 102. Files of the virtual file system 108 are stored and maintained in a file system 114 on a server system 110. The VDDM 100 provides high speed performance and response for user interactions, similar to a local real-time file system. The virtual file system 108 is a virtualized local file system, where local data files may or may not be available on the local file database, but will have a "backing stored" copy on the server system 110.

Note that the VDDM 100 is not necessarily optimized for read only file systems such as large application code directories or input-output (IO) intensive, multi-user shared database file systems. For both of these cases above, the VDDM 100 may not perform optimally.

The VDDM 100 appears to a client computer 100 as another file system, such as a local drive. This appearance is implemented using VDDM file system device drivers 106 specially designed for the VDDM 100. The VDDM file system device drivers 106 are connected to a client transaction processor 104, which processes instruction of the VDDM 100 on the client computer 102. The file system 114 will appear to the end-user operating system as a local or network file system, when the user is interfacing with the virtual file system 108. On the server side, the file system 114 is connected to a server transaction processor 112, which processes instructions of the VDDM 100 on the server system 110.

Client side file IO is localized when possible. The remote server file system 114 directory structure is copied and replicated onto a local directory structure, including individual file statistics. The local directory structure in the virtual file system 108 allows the end-user applications to traverse directory trees locally without having to access the server system 110. When individual files are opened by the operating system of the client computer 102, the file is transferred from the remote servers and all subsequent access to the file is local to the client computer 102. The virtual file system 108 replicates and/or references the master copy of the file on the remote central server system 110.

Transaction File System Protocol

The VDDM 100 utilizes several technologies to isolate network file system communications to atomic and stateless transactions. Each transaction processed will retrieve data, update the central file system directory or update individual files.

File system mounts appear as network drives on operating systems of client computers. Once created, most operating systems remount file systems at initialization or login. The mount file system operation transfers a copy of the directory structure from the central server system 110, and creates this directory structure on the client computer 102. This directory includes the full path structure for each file in the file system and the individual file statistics. All subsequent read access to the directory structure is performed against the client copy.

Directory operations include but are not limited to create directory; remove directory; rename file, where the individual file is not affected because rename is a directory operation; and delete file, where removal of the orphaned file is left to temporary storage garbage collection. Also, local modifications to the directory on the virtual file system 108 are queued to the central directory structure on the file system 114.

Figure 2:
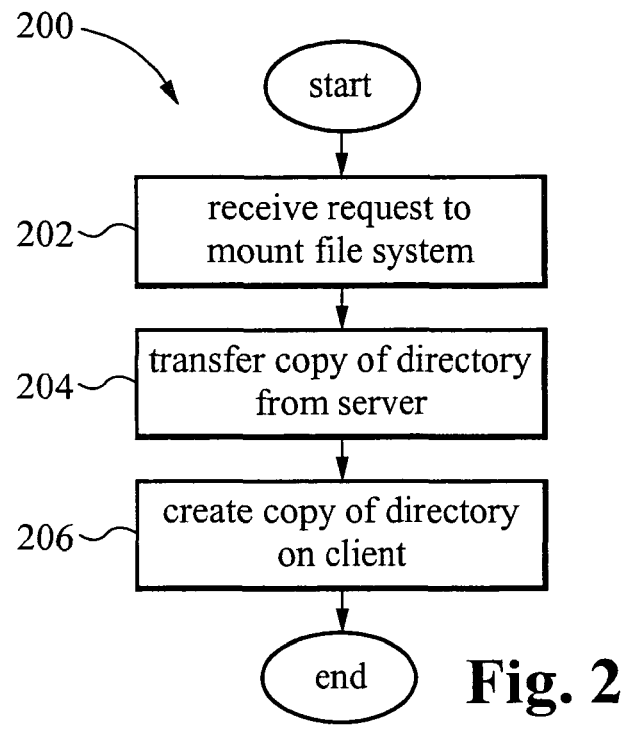
FIG. 2 is a flowchart of a mount file process, in accordance with the present invention.

FIG. 2 is a flowchart of a mount file process 200, in accordance with the present invention. In step 202, the VDDM 100 receives a request to mount the file 114 onto the client computer 102. The actual file 114 is not mounted onto the client computer 102. Instead, in step 204, the VDDM 100 transfers a copy of the file system directory from the server system 110 to the client computer 102. In step 206, the VDDM 100 then creates the copy of the file system directory on the client computer 102. The mount file process 200 is then completed.

In a dismount file system operation, the local directory and existing temporarily stored files are retained. When the system is remounted, the directories are synchronized. The local files are used later to eliminate or reduce resources in transferring data to/from the central server. If the retained data is not used within a certain period, this stored data will eventually be expired by the temporary storage manager operation.

Figure 3:
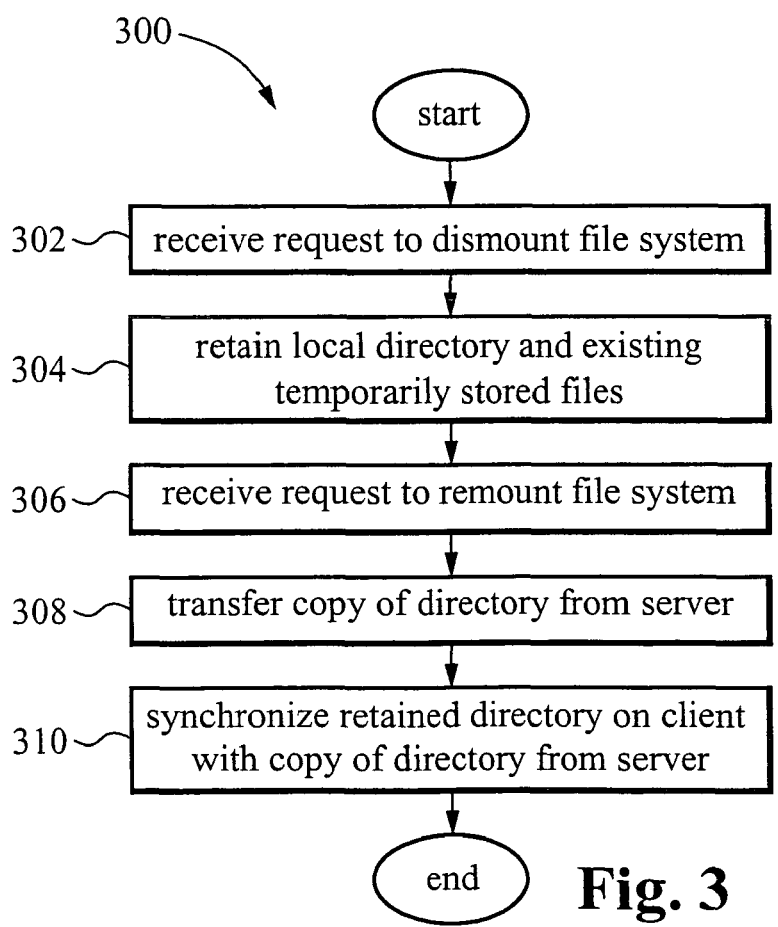
FIG. 3 is a flowchart of a dismount file system process, in accordance with the present invention.

FIG. 3 is a flowchart of a dismount file system process 300, in accordance with the present invention. In step 302, the VDDM 100 receives a request to dismount the file system from the client computer 102. As discussed above with reference to FIG. 2, the actual file system 114 is not mounted on the client computer 102. Instead, the client computer 102 contains a copy of the file system directory. The VDDM 100, in step 304, retains a local directory of the file system on the client computer 102, as well as the existing temporarily stored files. Next, in step 306, the VDDM 100 receives a request to remount the file system. The VDDM 100 then transfers a copy of the directory from the server system 110 to the client computer 102 in step 308. The VDDM 100, in step 310, synchronizes the retained directory on the client computer 103 with the copy of the directory from the server system 110. The dismount process is then complete.

Open file operations include but are not limited to the following: read, write, create, and truncate. The file open (read, write) operation transfers a copy of the central server file to the client computer 102.

Figure 4:
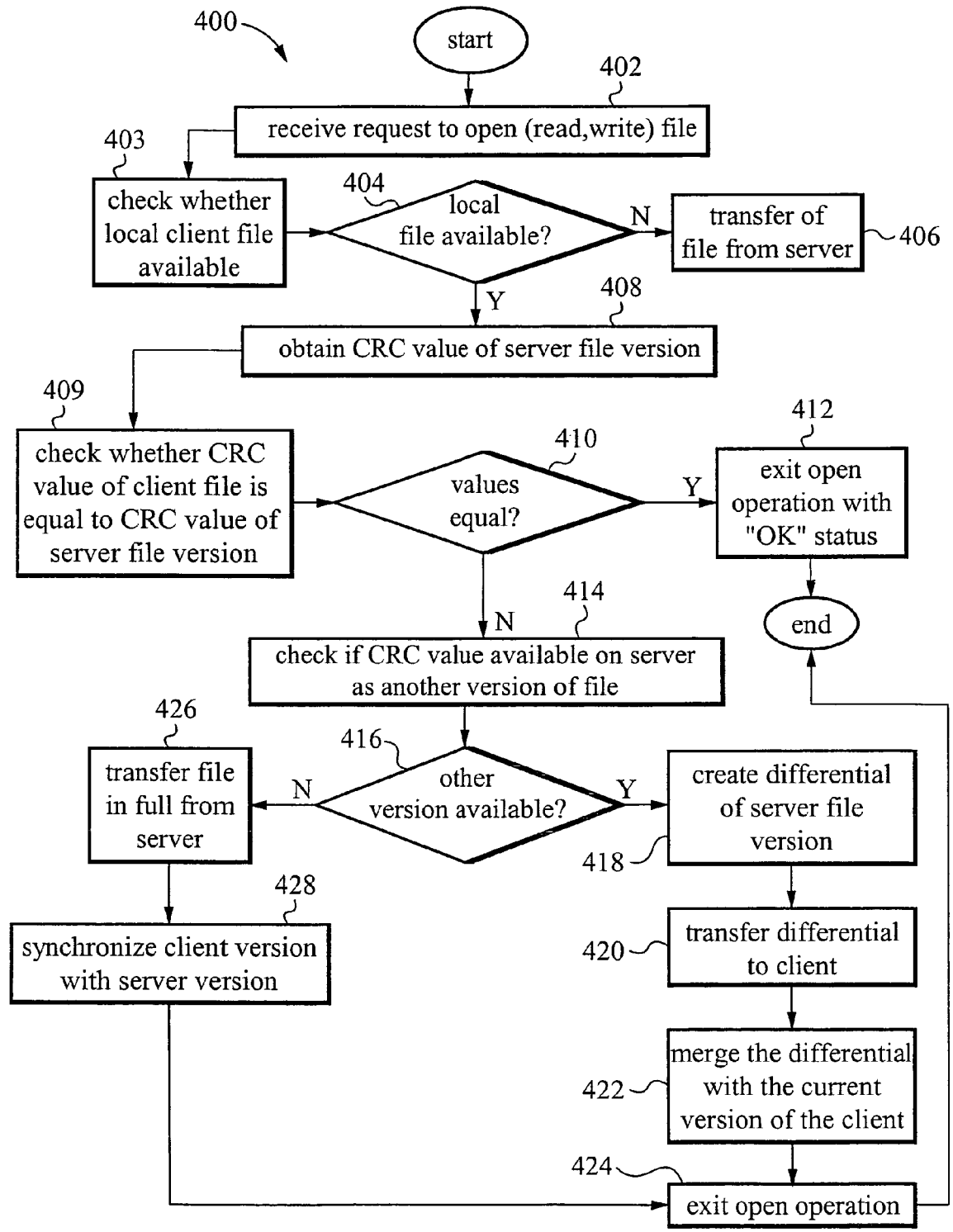
FIG. 4 is a flowchart of a file open (read, write) process, in accordance with the present invention.

FIG. 4 is a flowchart of a file open (read, write) process 400, in accordance with the present invention. The VDDM 100 receives a request to open (read, write) file in step 402. The VDDM 100, in step 403, checks whether a local client file is available on the client computer 102. If the VDDM 100 determines in the decision operation 404 that a local file is not available, then in the step 406, the VDDM 100 transfers a copy of the file from the server system 110. However, if the VDDM 100 determines in the decision operation 404 that a local file is available, the VDDM 100 obtains the cyclic redundancy check (CRC) value of the server system file version in step 408.

The file open (read, write) process 400 then moves to step 409, where the VDDM 100 checks whether the CRC value of the local client file is equal to the CRC value of the server system file version. If the values are equal, the VDDM 100 exits the file open (read, write) process 400 with an OK status, meaning opening the file is acceptable. However, if the values are unequal, the VDDM 100 checks whether the CRC value of another file on the server system 110 is equal to the CRC value of the local client file. In decision operation 416, if the VDDM determines that another file version with the same CRC exists on the server system 110, the VDDM 100 creates in step 418 a differential of the server file having the same CRC and the current version on the server. In step 420, the VDDM 100 transfers this differential from the server system 110 to the client computer 102. The VDDM 100 then merges the differential with the current version on the client computer 102 to create a current file that matches the current version on the server system 110.

On the other hand, in decision operation 416, if the VDDM 100 determines that another file version with the same CRC is not available on the server system 110, the VDDM 100 transfers the file in full from the server system 110 to the client computer 102 in step 426. The VDDM 100, in step 428, then synchronizes the client version of the file with the server version. Such synchronization involves performing a "sliding CRC" transfer algorithm on the file. The VDDM 100 exists the file open (read, write) process 400 in step 424. The file open (read, write) process 400 is then completed.

The file open (create, truncate) process creates a new file on the client file structure. The server file system will be updated asynchronously as a background operation. The differential file transfer will provide a truncate function by deleting all data within the file, retaining the file statistics as an empty file. If network connection is aborted before all asynchronous updates complete, the client will complete the queued transactions when the network connection becomes available.

Figure 5:
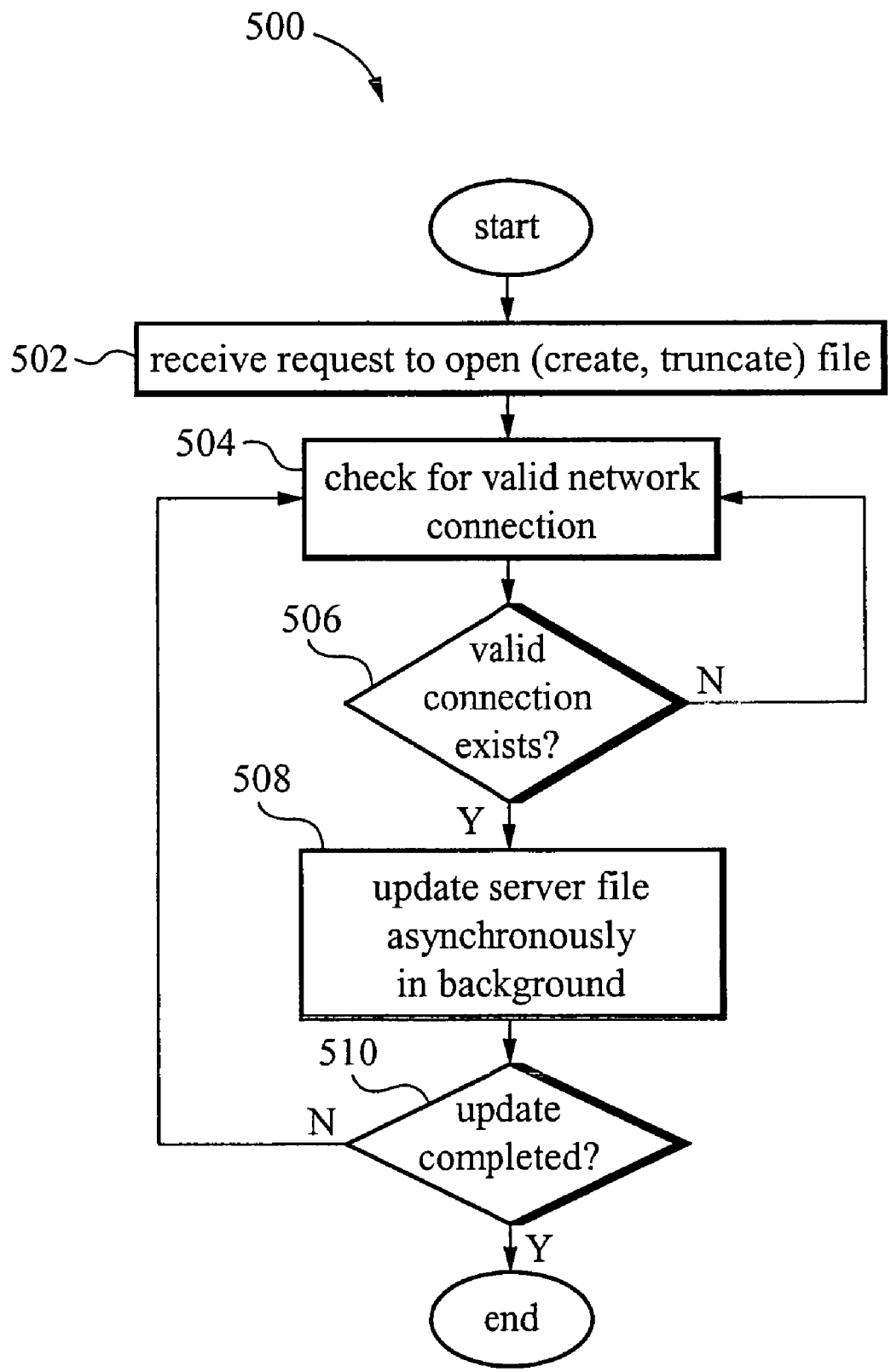
FIG. 5 is a flowchart of a file open (create, truncate) process, in accordance with the present invention.

FIG. 5 is a flowchart of a file open (create, truncate) process 500, in accordance with the present invention. In step 502, the VDDM 100 receives a request to perform a file open (create, truncate). The VDDM 100 then checks for a valid network in step 504. If the VDDM 100 determines in decision operation 506 that a valid network connection does not exist, the VDDM 100 continues to check for a valid network connection in step 504. Once the VDDM 100 determines in decision operation 506 that a valid network connection exists, the VDDM 100 updates the server file in step 508. The update is performed asynchronously in the background. During the update, the differential file transfer is performed. The network connection may abort midway through the update. If the VDDM 100 determines in decision operation 510 that the update is not complete, the VDDM 100 returns to step 504 and checks for a valid network connection until a valid network connection exists. The file open (create, truncate) process 500 moves again to update the server file in step 508 during existence of a valid network connection. Once the VDDM 100 determines in decision operation 510 that the update is completed, the file open (create, truncate) process 500 is completed.

Read operations are performed against the local copies of the file. Read operations include but are not limited to the following: read and seek.

Write operations are performed against the local copy of the file. Write operations include but are limited to the following: write block and write append.

The server file system 114 will be updated asynchronously. Server file system updates happen by file group transactions in the background, based on a scheduled time interval and/or on file update activity.

Temporary Local Storage

The VDDM architecture maintains a local cached file system, as well as the "master" file system stored centrally. Retaining temporary local file system data provides several advantages over conventional systems. Performance increases greatly. Temporary storage technology greatly reduces network traffic. Much of the file IO is isolated to the local system, thereby reducing network traffic. Further, updates to the remote file system can be bundled in transactions, removing most of the network "chatter" created by small network file system operations of most network file system protocols. Furthermore, the temporary storage technology provides support for offline file system read and write access, where stored data will be written to the central storage servers asynchronously at the next active network connection.

Compressed Data

Certain document types compress more efficiently than other document types. Pre-compressed data formats, such as MP3 and GIF, do not compress appreciably. However, office business document types, such as word processing and spreadsheet documents, compress typically between about 70 to 80 percent.

Compressing data is quick, can reduce network usage, and can increase speeds of transfers. The VDDM protocol bundles transactions into larger information transactions, which allow for compression.

Differential File Transfer

The VDDM 100 uses a net-change algorithm to update files. The net-change algorithm reduces the network load required to read and write data to existing user data files. This algorithm takes advantage of the local client file system storage.

Figure 6:
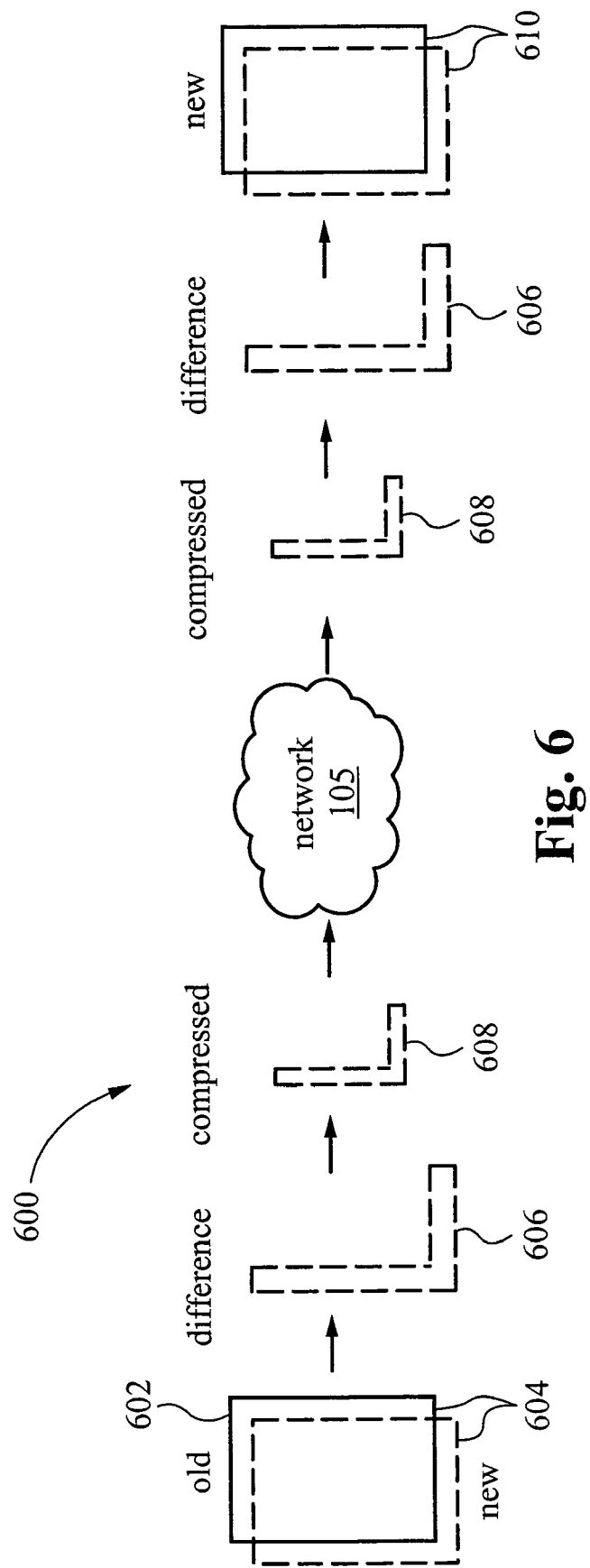
FIG. 6 is a graphical representation of a net-change algorithm, in accordance with the present invention.

FIG. 6 is a graphical representation of the net-change algorithm, in accordance with the present invention. As a file is saved from a user application, the client computer 102 compares the client current version 604 of the document with the client prior version 602 of the same document. The client computer 102 obtains difference information 606 and compresses the difference information 606 to obtain a compressed difference 608. The client computer 102 sends the compressed difference 608 of the two versions over the network 105 to the server system 110.

Once the differential data, or compressed difference 608, is transferred to the server system 110, the server system 110 decompresses the compressed difference 608 to obtain the difference information 606. This difference information 606 from the client computer 102 is merged with the server prior version of the file. The server prior version is patched, creating a server current version 610 with the exact contents of the client current version 604 on the client computer 102. This patching process reduces greatly network usage for file updates. Many applications do automatic saves, which create many periodic file update saves, with small changes occurring between updates.

Figure 7:
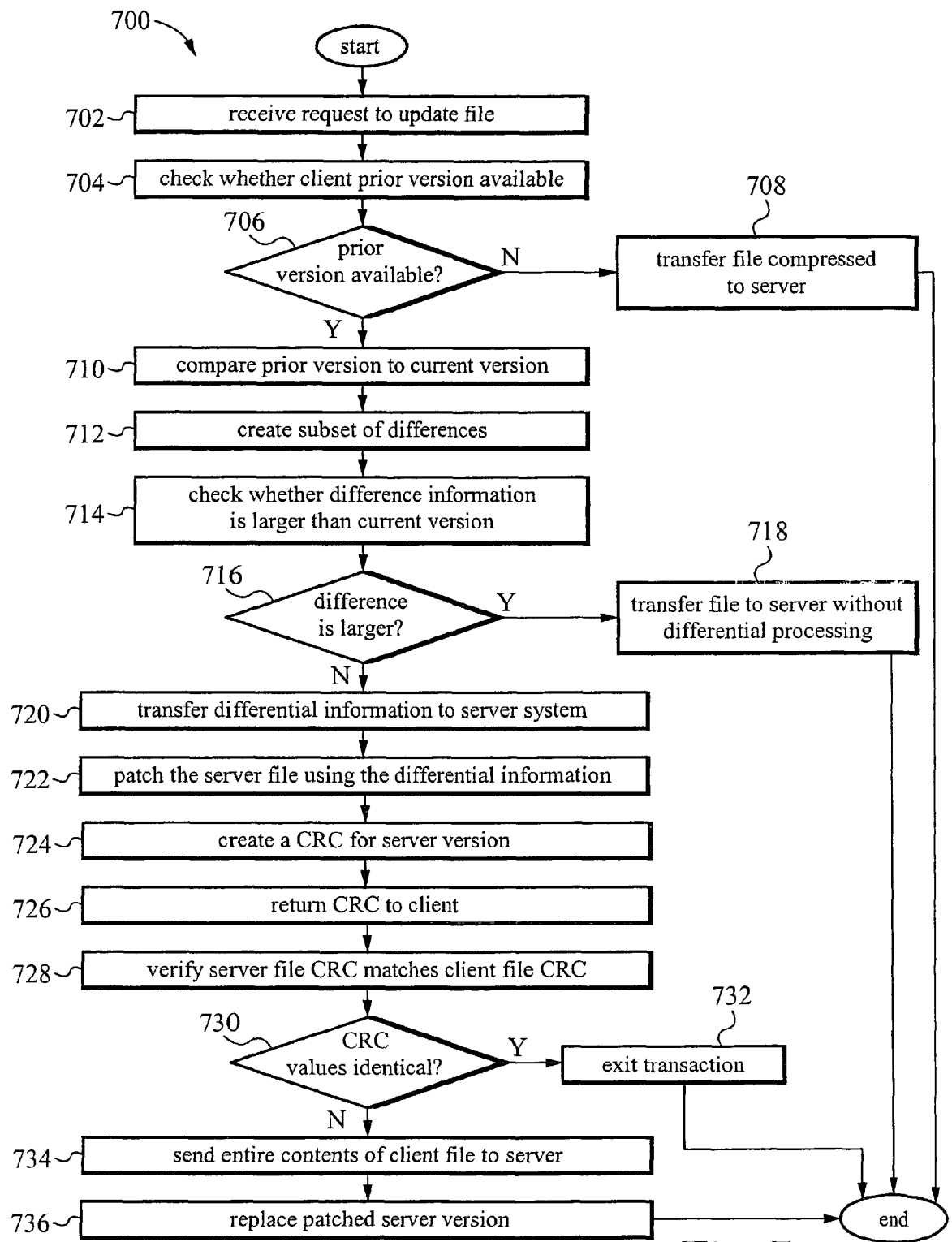
FIG. 7 is a flowchart for a file update process, in accordance with the present invention.

FIG. 7 is a flowchart for a file update process 700, in accordance with the present invention. In step 702, the VDDM 100 receives a request to update a file. The VDDM 100 then checks whether a client prior version 602 of the file is available on the client computer 102, in step 704. If the VDDM 100 determines in decision operation 706 that a client prior version 602 is not available, the file update process 700 moves to step 708 where the VDDM 100 transfers the file compressed to the server system 110. In such a case, differential transfer is not possible because no prior version is available.

On the other hand, if the VDDM 100 determines in decision operation 706 that a client prior version 602 is available on the client computer 102, the VDDM 100 compares the client prior version 602 to the client current version 604. From this comparison, the VDDM 100 creates a subset of the differences in step 712. The difference information 606 will include addition and deletion information. In step 714, the VDDM 100 then checks whether the difference information 606 is larger than the client current version 604. If the VDDM 100 determines in decision operation 716 that the difference information 606 is larger, the VDDM 100 transfers the file compressed to the server system 110, in step 718, without performing differential processing.

However, if the VDDM 100 determines in decision operation 716 that the difference information 606 is not larger, the VDDM 100 transfers the compressed difference 608 to the server system 110 in step 720. The server system decompresses the compressed difference 608. In step 722, the VDDM 100 patches the server prior version using the difference information 606 to create a server current version 610. The VDDM 100 then creates a CRC for the server current version 610 in step 724. In step 726, the VDDM 100 returns this CRC value to the client computer 102. The VDDM 100 then verifies that the CRC value of the server current version 610 matches the CRC value of the client current version 604 in step 728. If the VDDM 100 determines in decision operation 730 that the CRC values are identical, the VDDM 100 exits the file update process 700 in step 732.

On the other hand, the CRC values may be unequal, which likely means the file update process 700 has somehow collided with processes initiated by another user. This provides a safeguard for environments without a file locking mechanism. If the VDDM 100 so determines in decision operation 730 that the CRC values are unequal, the VDDM 100 sends the compressed entire contents of the client current version 604 to the server system 110 in step 734. In step 736, the VDDM 100 replaces entirely the server current version 610 with a copy of the client current version 604. The file update process 700 is then completed.

Queued Background Writes

The VDDM 100 performs write operations real time to files on the client computer 102. Writes back to the central file system are batched and performed on a periodic schedule depending on file update activity. The VDDM 100 bundles in the background all update activity into transactions, thereby providing transaction based, high performance on high latency network connections, such as for example, a wide-area network. This method of file writings across slower WAN networks does not create undue performance lags to users.

The period between transactions is performed when the following occur: there has been file update activity; a time interval has expired, usually about 5 seconds; update file IO is larger than a transaction, usually about 300 kilobytes; and the server system 110 is available via a network connection.

Offline Data Read Process

The VDDM method of storing local versions of data also has the advantage of allowing a form of offline access to data. When a client computer 102 is disconnected from the server system 110, and the user is using the hardware device that created the last updates on the file system, the client computer 102 will likely contain a copy of the most recent version of user data. When the user attempts to open a document from a VDDM 100, and the network 105 is disconnected, the user is prompted with a warning message. The user then has the option of waiting for a network connection to be available or working on the data offline.

Figure 8:
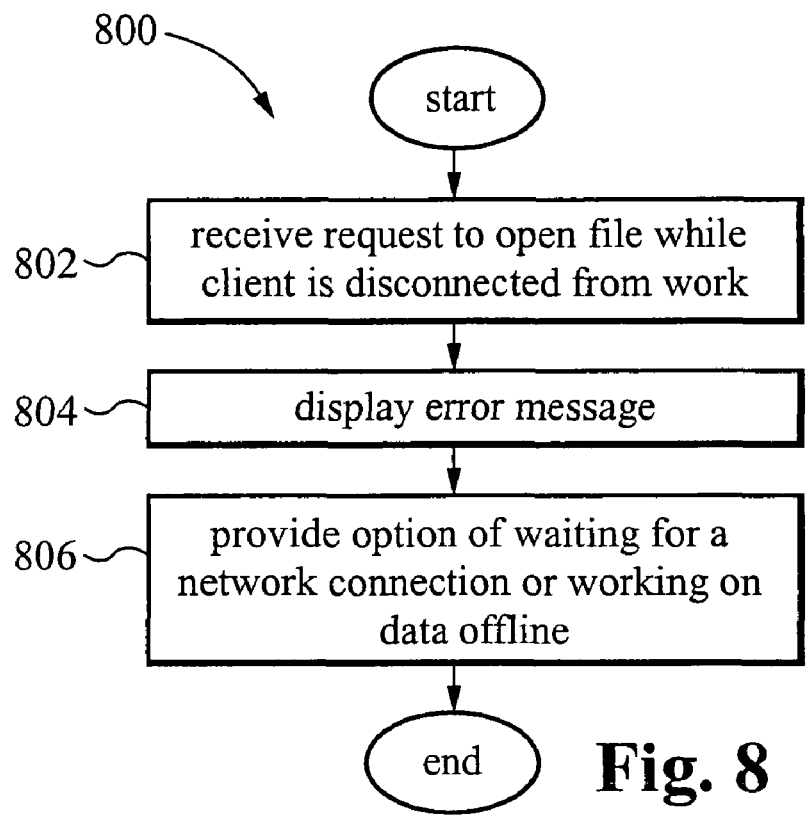
FIG. 8 is a flowchart of an offline data read process, in accordance with the present invention.

FIG. 8 is a flowchart of an offline data read process 800, in accordance with the present invention. In step 802, the VDDM 100 receives a request to open a file of the VDDM 100 while the client computer 102 is disconnected from the network 105. The VDDM 100 displays an error message on the display of the client computer 102 in step 804. In step 806, the VDDM 100 then provides an option of waiting for a network connection or working on the data offline. The user may then select the appropriate option. The offline data read process 800 is then completed.

Offline Data Write Process

The Virtual Distributed Data Manager queues writes in the background. If a user is updating data in the background and the network is not available, the write operations will continue to the local file system, and updates will continue to queue until the network becomes available.

Figure 9:
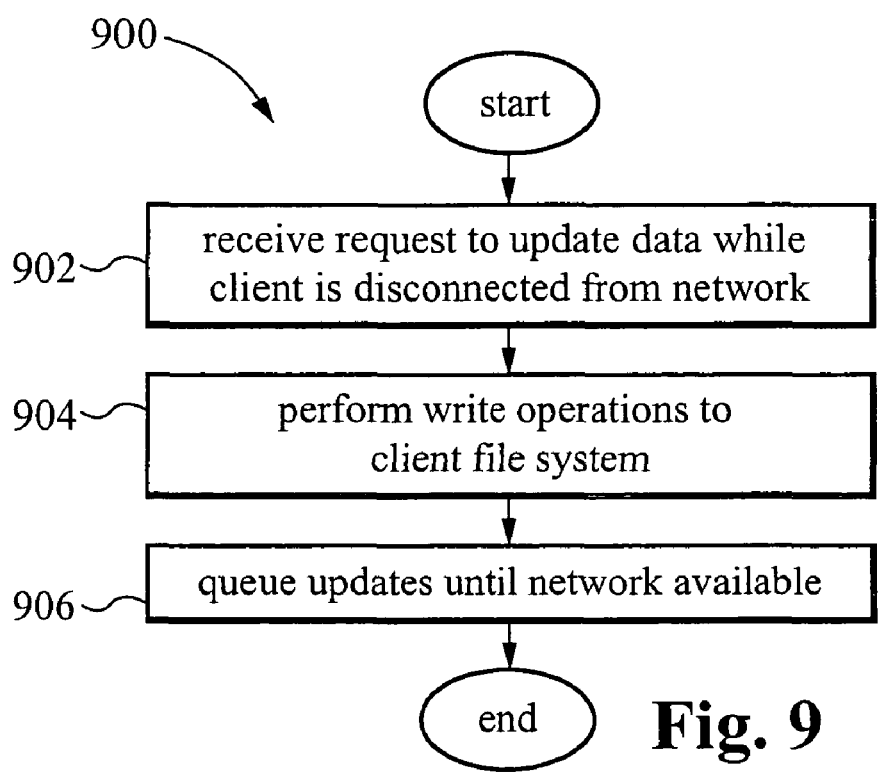
FIG. 9 is a flowchart of an offline data write process, in accordance with the present invention.

FIG. 9 is a flowchart of an offline data write process 900, in accordance with the present invention. In step 902, the VDDM 100 receives a request to update data while the client computer 102 is disconnected from the network 105. The write operations will be performed to the virtual file system 108 in step 904. In step 906, these updates will queue in the client computer 102 until a network connection to the server system 110 exists. The offline data write process 900 is then completed.

Server File System Versioning

The VDDM server file system 114 will optionally retain prior versions of files. Each server prior version is suffixed with the time and date. File versions are retained based on time expirations or maximum generation quotas for each file.

Data Stored Encrypted

It is important to store user data encrypted with the user encryption password on the server system 110. Data stored centrally is exposed to the personnel that maintain the hardware and backup systems. This exposure is not as vulnerable when the data is encrypted because even technicians of the server system 110 have no way of decrypting data.

Preferably, the personnel of the server system 110 cannot decrypt data if the user loses his encryption password. Accordingly, such data stored on the server system 110 is permanently lost.

Synchronize Local Data

The user can optionally select individual files or folders to be synchronized with the central server. Once a file is tagged as synchronized, the VDDM 100 will insure that there is always a current copy of this file or folder on the client computer 102. This tagging is done inside the user's profile. So, if the user migrates to a different end-user hardware device, the user data will only migrate to the end-user device as needed unless the synchronize flag is set.

Figure 10:
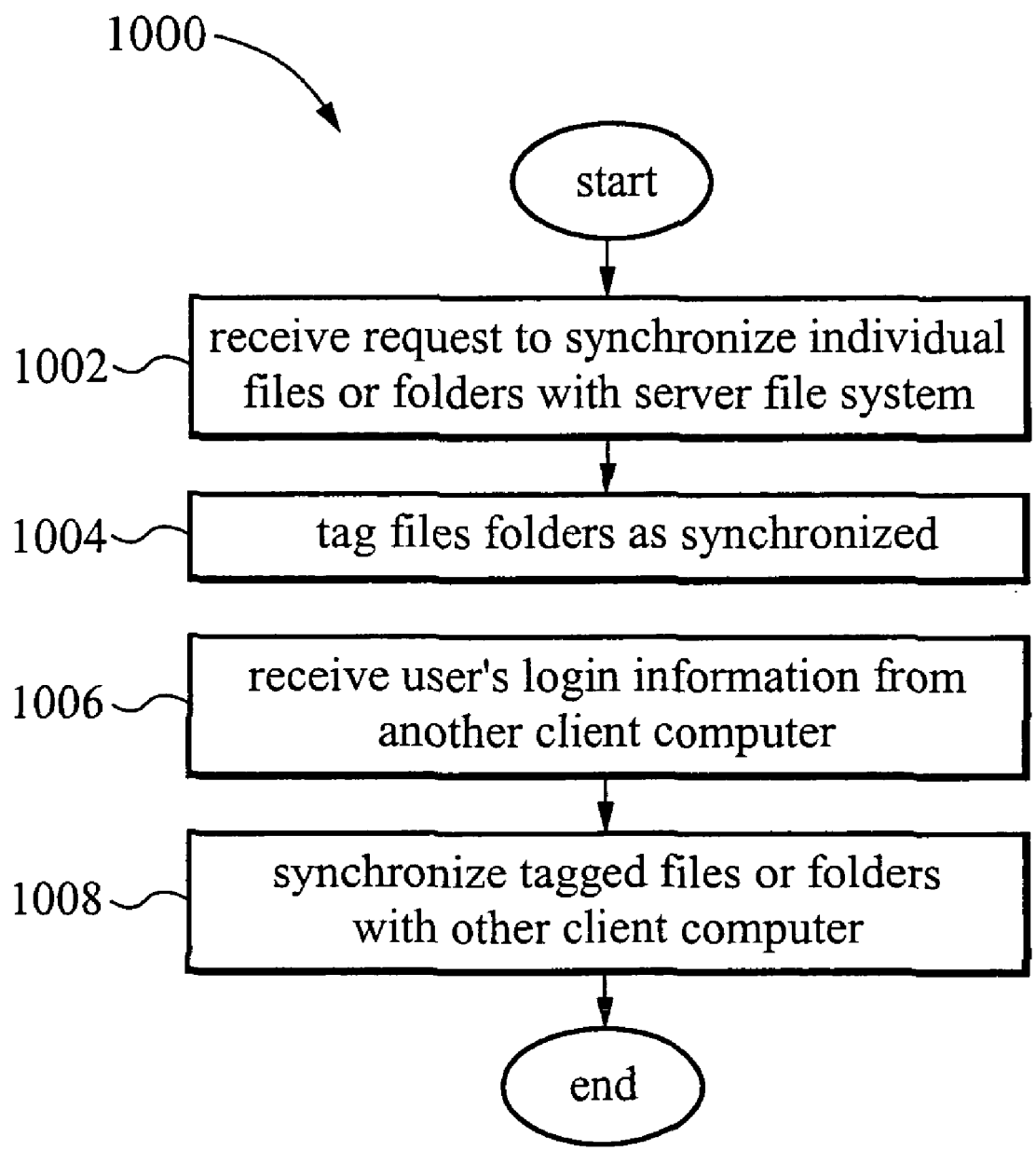
FIG. 10 is a flowchart of a synchronize client data process, in accordance with the present invention.

FIG. 10 is a flowchart of a synchronize client data process 1000, in accordance with the present invention. In step 1002, the VDDM 100 receives a request to synchronize individual files or folders with the server file system 114. The VDDM 100 synchronizes these files and tags these files or folders, in step 1004, as synchronized. The user may move to another client computer. In step 1006, the VDDM 100 receives the user's login information from the other client computer. The VDDM 100 will migrate the user data as needed to the other client computer. However, in step 1008, the VDDM 100 will make sure to synchronize the tagged files or files with the other client computer. The synchronize client data process 1000 is then completed.

According to systems and methods described above, the VDDM 100 is a set of technologies that uses a localized directory structure on an end-user device. Temporary storage is created on the client computer 102 as a virtual file system 108, which contains a directory of the file system 114 stored on the server system 110. When a user accesses or changes a file through the virtual file system 108, the VDDM 100 uses a net-change algorithm to synchronize the virtual file system 108 on the client computer 102 with the file system 114 stored on the server system 110.

The VDDM 100 presents several advantages over conventional systems. File updates are performed as a net-change operation. Applications typically create and write a completely new copy of the file each time a document update is performed. Such copying creates a large amount of IO, which is acceptable on local hard drive file systems or Local Area Networks, but are a major problem over WAN's. In the VDDM 100, however, a local copy of each version of the document is available. Accordingly, only document "differences" are required to be transferred over the network to the central server.

Another advantage is that file system updates are performed as stateless transactions, which allow the system to scale extremely large user bases. This mechanism will scale because the underpinning technologies are Web hypertext transfer protocol (HTTP) technologies, and will scale to any size.

Still another advantage is that file system writes and updates are compressed. The file system uses transactions, which perform whole operations. Network file systems, on the other hand, are a stream of many small tasks. Accordingly, the VDDM 100 can take advantage of data compression, which has efficiencies of compressing typical data files to between about 50 to 90 percent of their uncompressed size.

Yet another advantage is that file write operations can be performed in the background. The end-user write operation is written to the local file system, and the application responds immediately since the local file system is fast. The write operation via network transfer is queued and completed in the background.

A further advantage is that the VDDM 100 uses a store and forward mechanism, with background data synchronization. The VDDM 100 also supports local temporary file system storage for offline reads and writes. When the data file is available locally, the user can optionally use the local file copy. When the user updates this local file, the write operation can be performed to the central server version when the network is available. If necessary, the VDDM 100 will wait until the network is available.

Capabilities of a Virtual Application Manager

The VAM 100 provides desirable capabilities discussed above and further highlighted in the following discussion.

Central Data Storage—The technology provides the ability for client computers 101 to interface with a virtual file system 108 appearing local to the client computer operating system, while the data resides in a file system 114 on a centralized server system 110.

Scalability—Traditional file systems require heavy overhead to networks and storage systems. A VDDM 100 will scale similar to large transaction processing systems using Web technologies.

Multi-platform—The technology is operating system independent, so the file system drivers can be ported to different operating environments such as Microsoft Windows®, Unix®, Palm®, etc. Such portability allows the user data to move to different hardware infrastructures, independent of the underlying network technology.

Support for thin clients—The file storage relies on central storage, so the local storage is used for performance enhancement and offline access. Thin clients work well in this environment because local storage is not essential, and minimal local storage requirements create major performance increases.

Optimized for WAN—The protocols to transmit data from the end-user device to the central servers are optimized for high latency and possibly error prone network infrastructures, such as WAN'S.

Offline Access—The system provides a best-case support for access to data when the network is unavailable.

Minimal Hangs—Network systems commonly hang, waiting for network packet retransmits when intermittent network errors occur. The system minimizes this delay by using local data caching, write back, and transactional transfer technologies.

Firewall Friendly—The network application protocols use HTTP and XML technologies, which are safe for end-user networks and typically available through most firewalls.

Secure Repository—Centralized storage is encrypted for security. Even central server administrators managing storage have no capability to decrypt and obtain the contents of this data.

Optimized Performance—Application data can be voluminous and require large transmit times over lower performing networks. Extensive use of compression, differential data transfer, sliding CRC, and other technologies are used to minimize data transfer times.

Fault Tolerant Storage—The data transfer technologies use transaction mechanisms similar to financial systems. These transaction mechanisms have provisions for access to high uptime, fault tolerant storage technologies, such as geographically dispersed replicated storage facilities.

Synchronization—Files can be optionally tagged as synchronized. Such tagging insures that end-user copies of data are always replicated and synchronized with central server versions.

File Versioning—Each update copy of each file can be optionally stored with a version tag. Older versions of files are thereby available.

System and Method Implementation of a Virtual Application Manager

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving a request to mount a file system onto the client computer, wherein the file system is stored on the server system and contains the one or more data files; transferring a copy of a director of the file system stored on the server system to the client computer; and creating on the client computer a virtual file system including the copy of the directory, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing one or more data files over a network, wherein the network is configured to be connected to a server system and to a client computer, the method comprising:
   receiving a request to mount a file system onto the client computer, wherein the file system is stored on the server system and contains the one or more data files;
   transferring a copy of a directory structure of the file system stored on the server system to the client computer;
   generating on the client computer a virtual file system including the copy of the directory structure, wherein the virtual file system is an individual user file system, and further wherein each of the one or more data files are not transferred from the server system to the client computer until individually requested;
   receiving a request to open a data file of the one or more data files;
   determining whether a client file version of the data file is available on the client computer;
   determining that a client file version is available;
   obtaining a Cyclic Redundancy Check value of a server file version of the data file;
   obtaining a Cyclic Redundancy Check value of the client file version of the data file;
   comparing the Cyclic Redundancy Check value of the server file version to the Cyclic Redundancy Check value of the client file version;
   determining that the Cyclic Redundancy Check value of the server file version is unequal to the Cyclic Redundancy Check value of the client file version;
   checking whether a Cyclic Redundancy Check value of another server file version is equal to the Cyclic Redundancy Check value of the client file version
   determining that the Cyclic Redundancy Check value of the other server file version is equal to the Cyclic Redundancy Check value of the client file version;
   generating a differential of the server file version;
   transferring the differential to the client computer; and
   merging the differential with the client file version to generate a current client file version matching the other server file version.

2. The method of claim 1, further comprising:
   determining that the Cyclic Redundancy Check value of the server file version is equal to the Cyclic Redundancy Check value of the client file version; and
   assigning an acceptable status to the request to open the data file.

3. The method of claim 1, further comprising:
   determining that the Cyclic Redundancy Check value of the other server file version is unequal to the Cyclic Redundancy Check value of the client file version;
   transferring a copy of the server file version to the client computer; and
   synchronizing the client file version with the server file version.

4. The method of claim 1, further comprising:
   determining that a client file version is unavailable; and
   transferring a server file version of the data file from the server system to the client computer.

5. The method of claim 1, further comprising:
   receiving a request to open a data file of the one or more data files;
   checking for a valid network connection between the client computer and the server system;
   determining that a valid network exists; and
   updating the file system stored on the server system.

6. The method of claim 5, wherein updating the file system is performed asynchronously as a background operation.

7. The method of claim 1, wherein the request to mount the file system is received when a network connection between the client computer and the server system does not exist, the method further comprising:
   displaying an error message; and
   providing an option of at least one of waiting for the network connection or working on data files offline.

8. A server system for managing one or more data files over a network, wherein the network is configured to be connected to the server system and to a client computer, the server system comprising a file system including a directory having a directory structure and the one or more data files, wherein the server system is configured to receive a request to mount the file system onto the client computer, to transfer a copy of the directory structure to the client computer, and to instruct the client computer to generate a virtual file system including a copy of the directory structure, wherein the virtual file system is an individual user file system, and further wherein each of the one or more data files are not transferred from the server system to the client computer until individually requested, wherein the server system is further configured to receive a Cyclic Redundancy Check value of a client file version of a data file, to obtain a Cyclic Redundancy Check value of a server file version of the data file, and to compare the Cyclic Redundancy Check value of the server file version to the Cyclic Redundancy Check value of the client file version, and further wherein if it is determined that the Cyclic Redundancy Check value of the server file version is unequal to the Cyclic Redundancy Check value of the client file version, then checking whether a Cyclic Redundancy Check value of another server file version is equal to the Cyclic Redundancy Check value of the client file version, and if it is determined that the Cyclic Redundancy Check value of the other server file version is equal to the Cyclic Redundancy Check value of the client file version, then generating a differential of the server file version, transferring the differential to the client computer and merging the differential with the client file version to generate a current client file version matching the other server file version.

9. The server system of claim 8, wherein the server system is further configured to receive a request to update a data file, and to receive difference information from the client computer, wherein the difference information is based on a comparison of a client prior version of the data file to a client current version of the data file.

10. A client computer for managing one or more data files over a network, wherein the network is configured to be connected to the client computer and to the server system, wherein the server system includes a file system having a directory with directory structure, wherein the client computer is configured to receive a request to mount the file system onto the client computer, wherein the client computer is further configured to receive a copy of the directory of the file system, the client computer comprising a virtual file system including the copy of the directory structure of the file system, wherein the virtual file system is an individual user file system, and further wherein each of the one or more data files are not transferred from the server system to the client computer until individually requested, wherein the server system is further configured to receive a Cyclic Redundancy Check value of a client file version of a data file, to obtain a Cyclic Redundancy Check value of a server file version of the data file, and to compare the Cyclic Redundancy Check value of the server file version to the Cyclic Redundancy Check value of the client file version, and further wherein if it is determined that the Cyclic Redundancy Check value of the server file version is unequal to the Cyclic Redundancy Check value of the client file version, then checking whether a Cyclic Redundancy Check value of another server file version is equal to the Cyclic Redundancy Check value of the client file version, and if it is determined that the Cyclic Redundancy Check value of the other server file version is equal to the Cyclic Redundancy Check value of the client file version, then generating a differential of the server file version, transferring the differential to the client computer and merging the differential with the client file version to generate a current client file version matching the other server file version.

11. The client computer of claim 10, wherein the client computer is further configured to receive a request to open a data file, and to check whether a client file version of the data file is available on the client computer.

12. The client computer of claim 10, wherein the client computer is further configured to receive a request to update a data file, to compare a client prior version of the data file to a client current version of the data file, and to generate difference information based on the comparing of the client prior version to the client current version.

13. A non-transitory computer-readable medium carrying one or more instructions for managing one or more data files over a network, wherein the network is configured to be connected to a server system and to a client computer, wherein the one or more instructions, when executed by one or more processors, cause the one or more processors to perform the following:

receiving a request to mount a file system onto the client computer, wherein the file system is stored on the server system and contains the one or more data files;

transferring a copy of a directory, having a directory structure, of the file system stored on the server system to the client computer;

generating on the client computer a virtual file system including the copy of the directory structure, wherein the virtual file system is an individual user file system, and further wherein each of the one or more data files are not transferred from the server system to the client computer until individually requested;

receiving a request to open a data file of the one or more data files;

determining whether a client file version of the data file is available on the client computer;

determining that a client file version is available;

obtaining a Cyclic Redundancy Check value of a server file version of the data file;

obtaining a Cyclic Redundancy Check value of the client file version of the data file;

comparing the Cyclic Redundancy Check value of the server file version to the Cyclic Redundancy Check value of the client file version;

determining that the Cyclic Redundancy Check value of the server file version is unequal to the Cyclic Redundancy Check value of the client file version;

checking whether a Cyclic Redundancy Check value of another server file version is equal to the Cyclic Redundancy Check value of the client file version determining that the Cyclic Redundancy Check value of the other server file version is equal to the Cyclic Redundancy Check value of the client file version;

generating a differential of the server file version;

transferring the differential to the client computer; and merging the differential with the client file version to generate a current client file version matching the other server file version.

* * * * *